(12) United States Patent
Jäger

(10) Patent No.: US 11,171,598 B2
(45) Date of Patent: Nov. 9, 2021

(54) SOLAR SYSTEM OR PHOTOVOLTAIC SYSTEM

(71) Applicant: Anton Jäger, Senden (DE)

(72) Inventor: Anton Jäger, Senden (DE)

(73) Assignee: Anton Jäger, Senden (DE)

( * ) Notice: Subject to any disclaimer, the term of this patent is extended or adjusted under 35 U.S.C. 154(b) by 287 days.

(21) Appl. No.: 16/343,187

(22) PCT Filed: Oct. 18, 2017

(86) PCT No.: PCT/EP2017/076639
§ 371 (c)(1),
(2) Date: Apr. 18, 2019

(87) PCT Pub. No.: WO2018/073322
PCT Pub. Date: Apr. 26, 2018

(65) Prior Publication Data
US 2019/0245480 A1    Aug. 8, 2019

(30) Foreign Application Priority Data

Oct. 20, 2016   (DE) .................... 10 2016 119 978.8

(51) Int. Cl.
| | |
|---|---|
| B08B 3/04 | (2006.01) |
| H02S 40/10 | (2014.01) |
| F24S 40/20 | (2018.01) |
| F24S 30/425 | (2018.01) |
| H02S 20/30 | (2014.01) |
| A47L 11/38 | (2006.01) |
| H02S 20/32 | (2014.01) |
| B08B 1/00 | (2006.01) |
| B08B 1/02 | (2006.01) |

(52) U.S. Cl.
CPC ............ *H02S 40/10* (2014.12); *A47L 11/38* (2013.01); *B08B 1/006* (2013.01); *F24S 30/425* (2018.05); *F24S 40/20* (2018.05); *H02S 20/30* (2014.12); *H02S 20/32* (2014.12); *B08B 1/02* (2013.01); *Y02E 10/47* (2013.01)

(58) Field of Classification Search
CPC ............ B08B 1/02; B08B 3/04; H02S 40/10
See application file for complete search history.

(56) References Cited

U.S. PATENT DOCUMENTS

| | | |
|---|---|---|
| 4,275,711 A | 6/1981 | Dumbeck |
| 8,650,693 B2 | 2/2014 | Singh et al. |
| 8,813,303 B1 * | 8/2014 | Meller .............. B08B 1/04 15/246 |
| 2013/0086761 A1 * | 4/2013 | Singh ............... F24S 40/20 15/77 |

FOREIGN PATENT DOCUMENTS

| | | |
|---|---|---|
| DE | 103 17 479 A1 | 11/2004 |
| DE | 20 2008 009 010 U1 | 9/2008 |
| EP | 2 623 886 A1 | 8/2013 |
| WO | 2011/135568 A2 | 11/2011 |
| WO | 2011/161696 A2 | 12/2011 |

* cited by examiner

Primary Examiner — Michael D Jennings
(74) Attorney, Agent, or Firm — Dinsmore & Shohl LLP

(57) ABSTRACT

A solar or photovoltaic system includes a cleaning apparatus for cleaning a surface of the solar or photovoltaic system. The surface to be cleaned is tilted or tiltable respect to the horizontal. The cleaning apparatus is configured to carry out a cleaning process to clean the surface in which at least one cleaning element moves downward over the tilted surface driven by gravity.

20 Claims, 5 Drawing Sheets

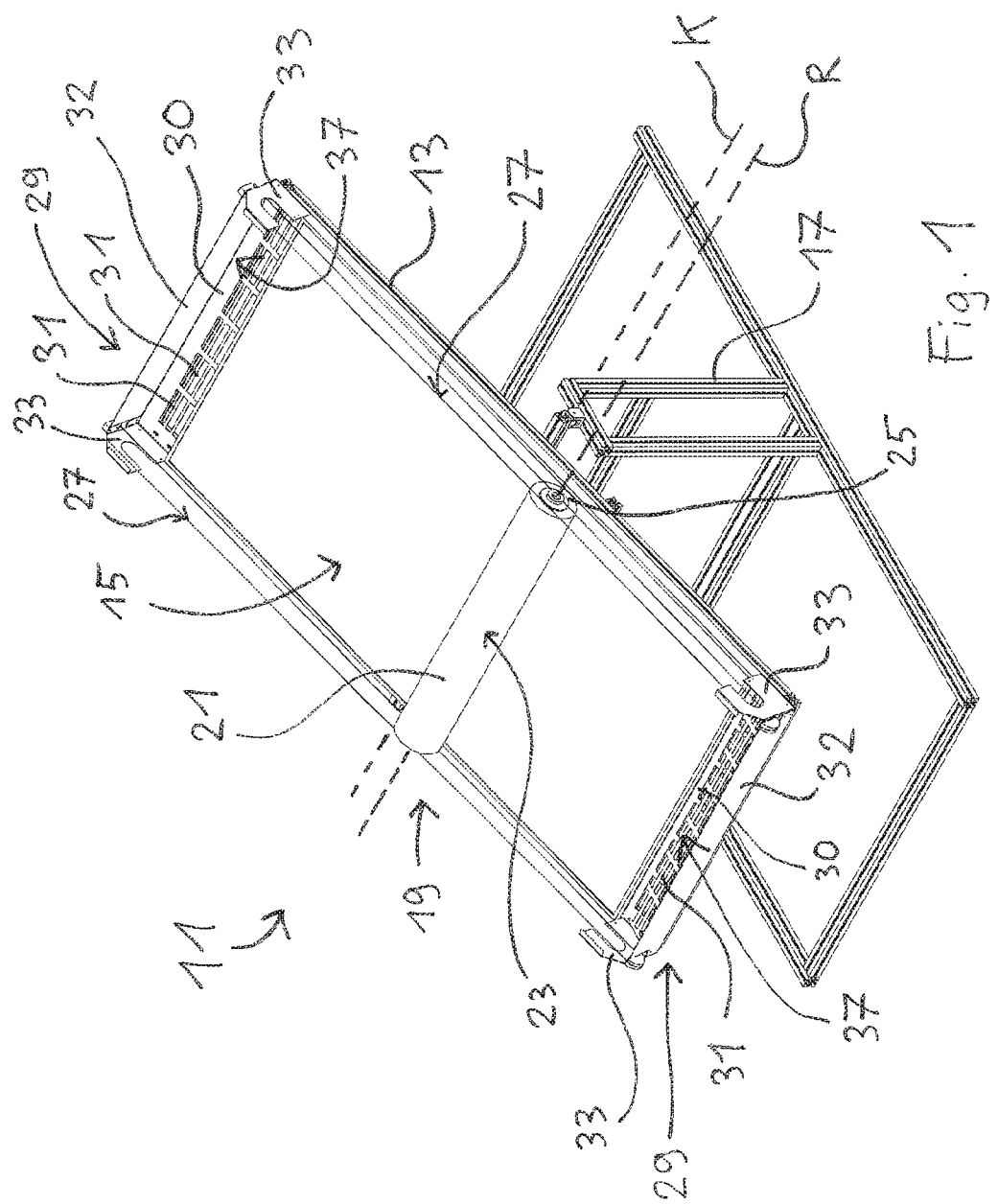

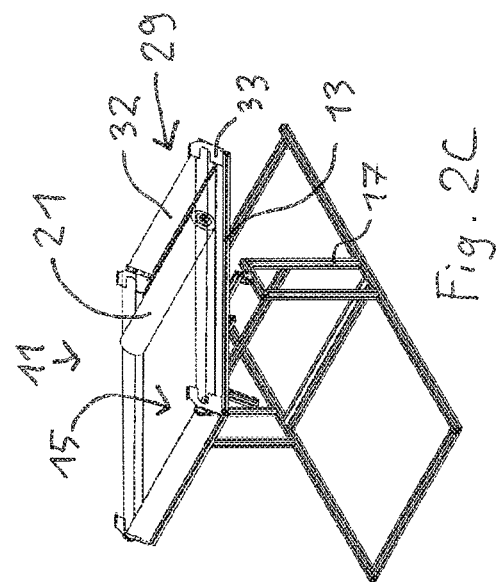
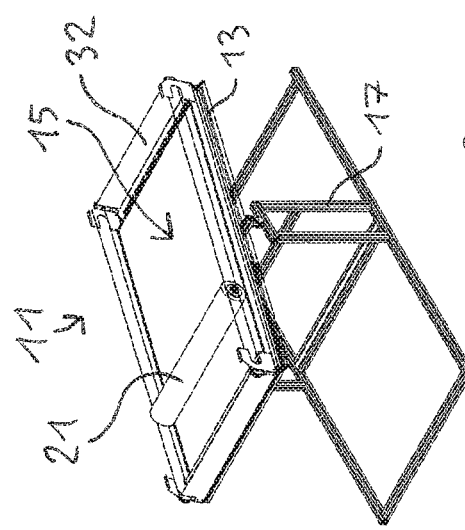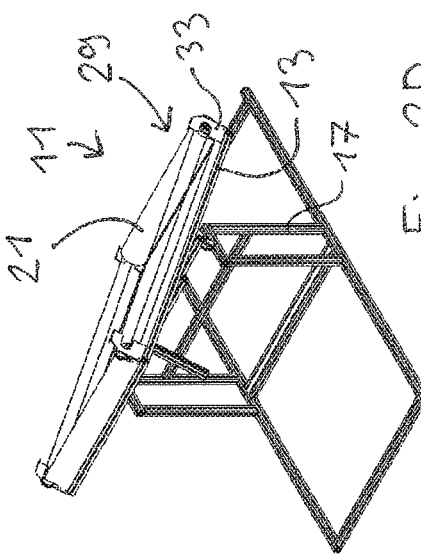
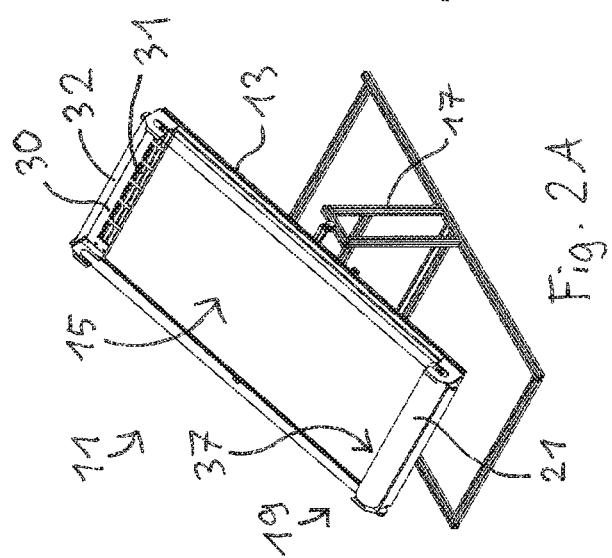

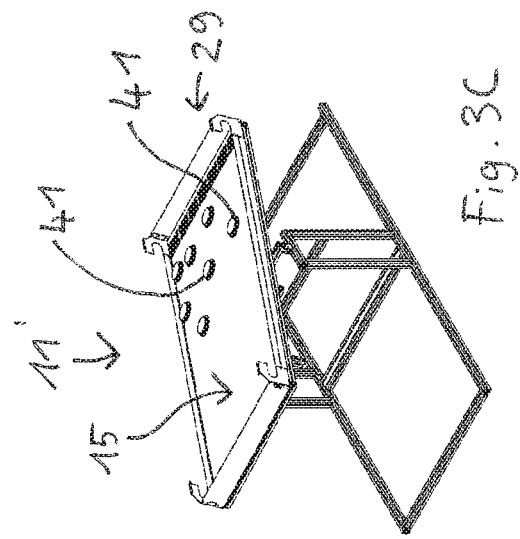
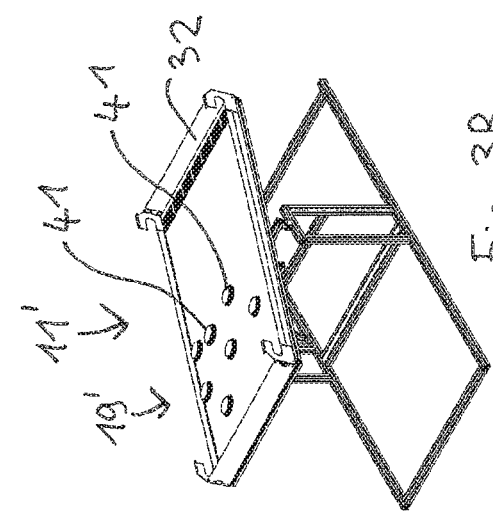
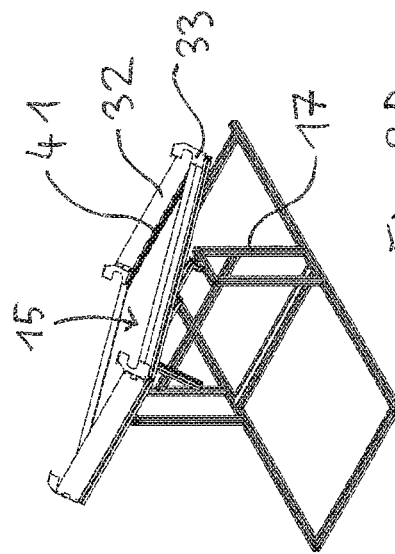
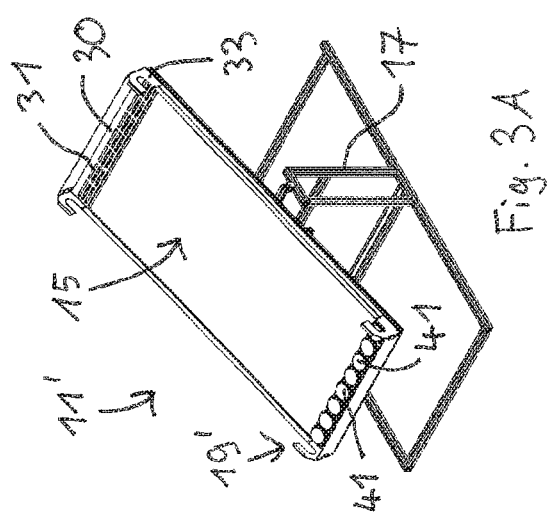

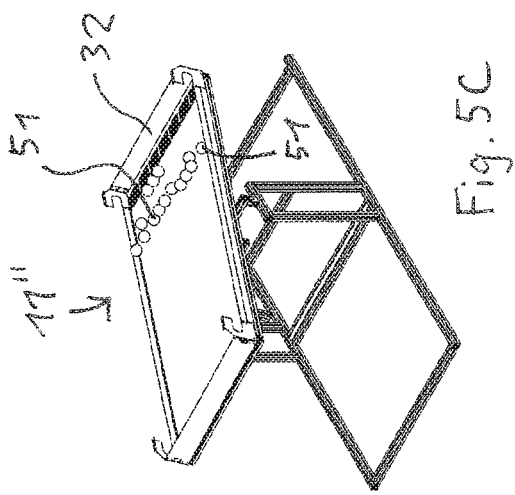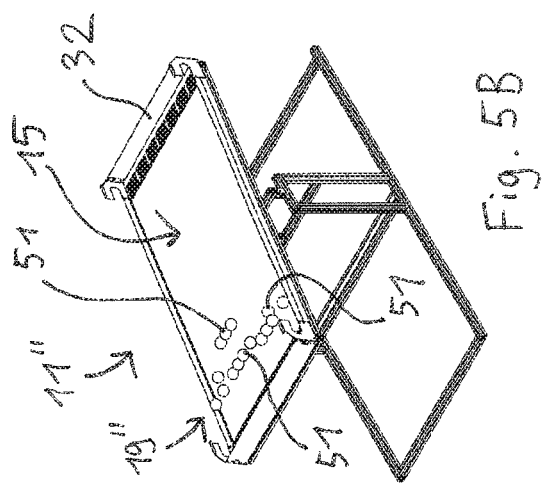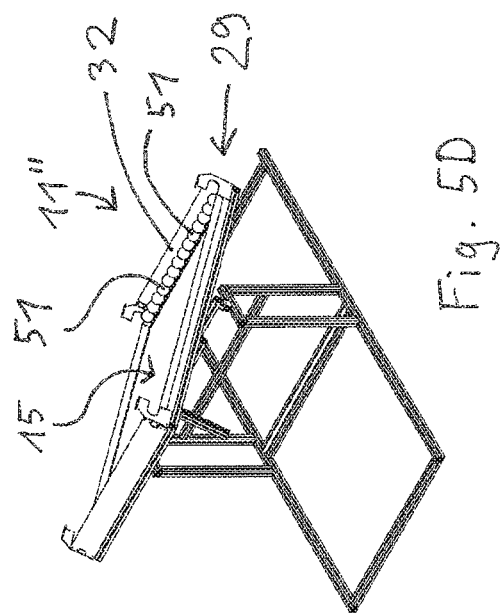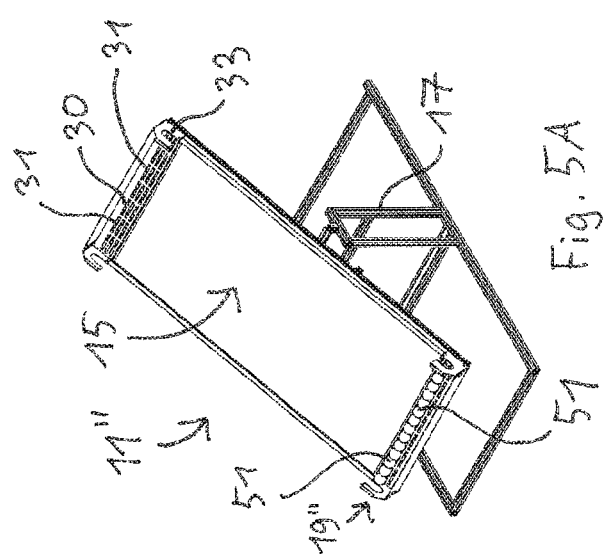

SOLAR SYSTEM OR PHOTOVOLTAIC SYSTEM

CROSS-REFERENCE TO RELATED APPLICATIONS

This application is a U.S. National Stage Application of PCT/EP2017/076639 filed Oct. 18, 2017, which claims priority to German Patent Application DE 102016119978.8 filed Oct. 20, 2016, the entire contents of which are incorporated herein by reference.

TECHNICAL FIELD

The present disclosure relates to a solar or photovoltaic system.

BACKGROUND

Such systems have surfaces to be exposed to solar radiation which inevitably become contaminated over the course of time. To counteract a reduction in the efficiency of a system, a regular cleaning of the corresponding surfaces is important. This can take place, for example, using hand brushes or manually guided machines, which is associated with a high labor effort, however.

There is therefore a desire to simplify the cleaning of solar systems and photovoltaic systems.

SUMMARY

This object is satisfied by a solar or photovoltaic system having the features of claim 1.

A solar or photovoltaic system in accordance with the present disclosure comprises a cleaning apparatus for cleaning a surface of the solar or photovoltaic system, wherein the surface to be cleaned is tilted or tiltable with respect to the horizontal. In accordance with the present disclosure, the cleaning apparatus is configured to carry out a cleaning process to clean the surface in which at least one cleaning element moves downward over the tilted surface driven by gravity.

A cleaning element or a plurality of cleaning elements is/are therefore allowed to move, in particular slide and/or roll, automatically over the tilted surface while utilizing gravity at least temporarily. A manual guidance of a hand brush or of a cleaning machine by a user is then not required. The cleaning apparatus can rather be integrated in the system and can be configured for an automatic carrying out of a cleaning process. The labor effort required for the cleaning is considerably reduced or even completely avoided in this manner. There is additionally the possibility of automating the cleaning which ensures a permanently high efficiency of the system.

In some embodiments, the cleaning element moves downward over the tilted surface in the cleaning process solely driven by gravity. No measures of any kind are then required to drive the cleaning element. In principle, gravity could, however, also only have a supportive effect, that is, it can, for example, only reduce the energy required for driving the cleaning element.

In some embodiments, the cleaning element has no own drive. Such a passive cleaning element is particularly energy-saving and maintenance-friendly.

An embodiment of the present disclosure provides that the cleaning apparatus has a drive which is configured to move the cleaning element upward for a respective subsequent gravity-driven cleaning movement. As soon as the cleaning element has been moved upward by the drive, for example up to an upper end section of the inclined surface, it is available for a further downward cleaning movement. The upward return transport of the cleaning element can take place over the tilted surface itself or outside this area in a separate device. For example, the drive could comprise a belt conveyor or a chain conveyor which is arranged next to the surface to be cleaned.

The cleaning element can freely slide over or roll off the tilted surface in the cleaning process. This enables a particularly simple construction.

If an exactly defined cleaning movement is desired, the cleaning element can, however, also be guided by a guide.

A specific embodiment of the present disclosure provides that the cleaning element comprises a rolling cleaning body such as a cleaning roller or a cleaning ball. Such a rolling body also moves downward without a problem with slightly inclined surfaces.

A guide can be provided for the rolling cleaning body and is configured to impart some slippage to the gravity-driven downward movement of the rolling cleaning body. The guide can therefore be designed such that it sets the rolling cleaning body into a rotation which is modified with respect to a rolling off rotation. The rolling cleaning body can then exert a brushing or sweeping effect, whereby the cleaning performance is improved.

The guide can in particular be configured to reverse the sense of rotation of the rolling cleaning body with respect to a free rolling off in the downward movement. Dirt particles are so-to-say hurled downward in this embodiment.

The guide can comprise a guide cable which wraps around a cable guide section of the rolling cleaning body at least once. A guide cable with a wrapping around enables the production of slippage in a particularly simple manner. The cable guide section can be a hub or a roller which has a groove for the guide cable and is e.g. arranged at the end face at the rolling cleaning body.

The cleaning element can also comprise a sliding cleaning body such as a cleaning block or a cleaning disk. Such a sliding cleaning body can e.g. slide downward like a brush disposed on the surface.

A specific embodiment of the present disclosure provides that the cleaning apparatus comprises a set of a plurality of cleaning elements which are simultaneously movable over the tilted surface. The cleaning elements themselves can then have a comparatively small size, with a complete cleaning of the surface nevertheless being provided. At least four cleaning elements or at least six cleaning elements are provided. The cleaning elements are at least arranged next to one another in a starting state.

The cleaning apparatus can also comprise a plurality of cleaning elements of the same kind in the form of bulk material. For example, the cleaning apparatus could be configured to release cleaning granulate from a container over the tilted surface. The handling of individual cleaning bodies is then not required.

To reliably remove contaminants from the surface, the cleaning element can have a set of bristles and/or a set of hook and loop fasteners.

Alternatively or additionally, the cleaning element can have a surface section which is absorbent and/or promotes adhesion. Depending on the application, the cleaning element can therefore be designed like a brush, a sponge or a lint roller.

In accordance with an embodiment of the present disclosure, the cleaning apparatus comprises a trigger apparatus which selectively blocks or releases a gravity-driven movement of the cleaning element over the tilted surface. An exact control of the system cleaning is possible in this manner. The trigger apparatus can be controllable via a signal line to be able to thus bring about a start of the cleaning process in dependence on a cleaning criterion. The trigger apparatus can, however, also be designed such that it releases the downward movement of the cleaning element in specific situations without an external control signal, for example, as soon as the angle of inclination of the tilted surface has reached a specific value.

An abutment can be provided for bounding a gravity-driven downward movement of the cleaning element. It is hereby avoided that the cleaning element falls down from the surface. The abutment can be a simple wall which is arranged at a lower end region of the tilted surface. If the surface is tiltable in different directions, an abutment is arranged at every possible lower end region.

The cleaning apparatus can comprise a receiver for accommodating the cleaning element. Such a receiver protects the cleaning element from contaminants and optionally from solar radiation. The receiver can in particular be designed in the manner of a housing.

A further embodiment of the present disclosure provides that the cleaning apparatus comprises a discarding device for contaminants collected by the cleaning element and to be discarded from the system. The ease of operation is hereby further increased since the user of the system does not have to take care of the removal of the collected contaminants.

The discarding device can comprise at least one ejection opening toward which the cleaning element is movable. In this embodiment, the cleaning element transports the dirt particles up to the ejection opening through which the particles then fall. An arrangement of a plurality of ejection openings and in particular a sieve or a lattice can also be provided, where necessary. The discarding device could also comprise a depression or a channel into which the collected contaminants move.

A further embodiment of the present disclosure provides that the discarding device comprises an additional cleaning device for cleaning the cleaning element. A washing system or the like could therefore be provided for the cleaning element to remove contaminants adhering to the cleaning element. The ease of operation is hereby further increased.

The solar or photovoltaic system can have a tracking drive to make the surface follow the position of the sun. The cleaning process can take place completely independently due to the change in inclination of the surface brought about on the basis of the tracking. In a number of solar and photovoltaic systems, the tracking comprises a to and fro tilting of the surface about a horizontal or slightly inclined axis once per day. In such systems, the cleaning element can move over the surface twice per day without further assistance. This is sufficient for an appropriate cleaning in many cases.

The cleaning apparatus can, however, also be connected to a control device of the tracking drive and can be configured to bring about a tilt movement of the surface in order to carry out the cleaning process. The cleaning process can be triggered independently of the position of the sun in this embodiment. The direct triggering of a cleaning process may be desired after a storm or severe weather, for example. If a particularly intensive cleaning is desired, the tracking drive can also be used for a multiple tilting to and fro of the surface.

The present disclosure also relates to a cleaning apparatus for a solar or photovoltaic system which has a surface tilted or tiltable with respect to the horizontal and said cleaning apparatus comprises at least one cleaning element; a receiver for the cleaning element fastenable to the surface; and means for bringing about a gravity-driven movement of the at least one cleaning element over the tilted surface. A cleaning apparatus in accordance with the present disclosure can in particular be designed as described above.

A method in accordance with the present disclosure for cleaning a solar or photovoltaic system provides tilting a surface to be cleaned with respect to the horizontal and arranging at least one cleaning element at the tilted surface such that it moves downward over the tilted surface driven by gravity.

Further developments of the present disclosure are also set forth in the dependent claims, in the description and in the enclosed drawings.

BRIEF DESCRIPTION OF THE DRAWINGS

The present disclosure will be described in the following by way of example with reference to the drawings.

FIG. 1 is a perspective representation of a photovoltaic system in accordance with a first embodiment of the present disclosure;

FIG. 2A shows a cleaning process, for cleaning a surface of the photovoltaic system shown in FIG. 1, with the photovoltaic system in a tilt position;

FIG. 2B shows the cleaning process, for cleaning the surface of the photovoltaic system shown in FIG. 1, with the photovoltaic system in a first tilted position;

FIG. 2C shows the cleaning process, for cleaning the surface of the photovoltaic system shown in FIG. 1, with the photovoltaic system in a second tilted position;

FIG. 2D shows the cleaning process, for cleaning the surface of the photovoltaic system shown in FIG. 1, with the photovoltaic system in an opposite tilt position;

FIG. 3A shows a cleaning process, for cleaning a surface of a photovoltaic system in accordance with a second embodiment of the present disclosure, with the photovoltaic system in a tilt position;

FIG. 3B shows the cleaning process, for cleaning the surface of the photovoltaic system of FIG. 3A, with the photovoltaic system in a first tilted position;

FIG. 3C shows the cleaning process, for cleaning the surface of the photovoltaic system of FIG. 3A, with the photovoltaic system in a second tilted position;

FIG. 3D shows the cleaning process, for cleaning the surface of the photovoltaic system of FIG. 3A, with the photovoltaic system in an opposite tilt position;

FIG. 5A shows cleaning process, for cleaning a surface of a of the present disclosure, with the photovoltaic system in a tilt position;

FIG. 5B shows the cleaning process, for cleaning the surface of the photovoltaic system of FIG. 5A, with the photovoltaic system in a first tilted position;

FIG. 5C shows the cleaning process, for cleaning the surface of the photovoltaic system of FIG. 5A, with the photovoltaic system in a second tilted position; and FIG. 5D shows the cleaning process, for cleaning the surface of the photovoltaic system of FIG. 5A, with the photovoltaic system in an opposite tilt position.

DETAILED DESCRIPTION

Figure 4:
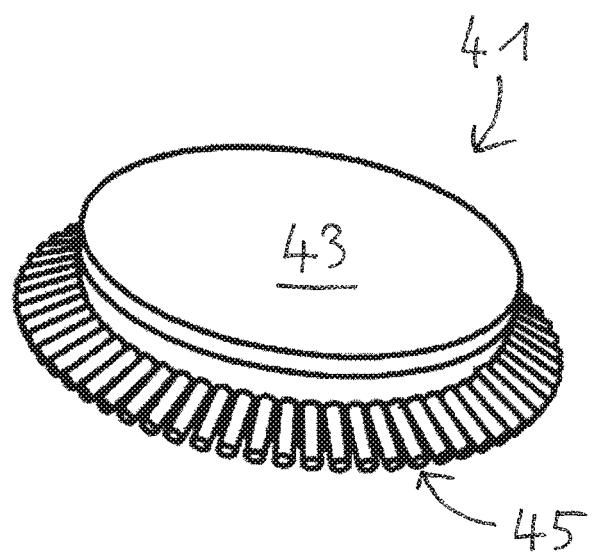
FIG. 4 is an enlarged representation of a cleaning element of the photovoltaic system shown in FIGS. 3A, 3B, 3C, and 3D.

The photovoltaic system 11 shown in FIG. 1 and FIGS. 2A to 2D comprises a solar cell module 13 having a surface 15 to be exposed to solar radiation which can be formed by mutually connected individual solar cells in a manner generally known. The solar cell module 13 is supported at a stand 17 in a manner tiltable about a horizontal tilt axis K. A tracking drive, for example an electric tracking drive, not shown, serves to make the tilt angle of the solar cell module 13 follow the position of the sun. A plurality of photovoltaic systems 11 can be combined into a total system to generate electrical energy from solar radiation.

A cleaning apparatus 19 integrated in the photovoltaic system 11 provides a regular cleaning of the surface 15 such as will be shown in more detail in the following.

The cleaning apparatus 19 shown in FIG. 1 specifically has an individual cleaning element in the form of a cleaning roller 21 rotatable about a horizontal axis of rotation R. The cleaning roller 21 can have a set of bristles and/or a set of hook and loop fasteners, which are not shown in the Figures, however. Alternatively, the roller surface 23 of the cleaning roller 21 can also be designed as absorbent or can be provided with a coating which promotes adhesion.

Respective cable guide rolls 25 in which respective guide cables 27 are guided are arranged at the two end faces of the cleaning roller 21. The guide cables 27 each extend along two oppositely disposed margins of the surface 15. Provision is made that the respective lower guide cable is guided in the cable guide roll 25 without a wrapping around while the upper guide cable 27 is guided in the cable guide roll 25 with a wrapping around. In the event of a downward movement, the cleaning roller 21 thereby rotates about the axis of rotation R in a reverse sense of rotation with respect to a free rolling off or rolling away. The respective lower guide cable 27 could generally also be guided in the cable guide roll 25 with a wrapping around. In this case, the speed of rotation of the cleaning roller is increased with respect to a free rolling off or rolling away in the event of a downward movement. In both cases, slippage results and is accompanied by a sweeping effect.

End plates 30 which are each provided with a sieve-like arrangement of holes 31 are located at the two ends 29 of the solar cell module 13 remote from the tilt axis K. Each end plate 30 forms a housing-like receiver 37 for the cleaning roller 21 together with a rear wall 32 and two oppositely disposed side walls 33. The receiver 37 could be supplemented with a cover, where necessary.

FIGS. 2A to 2D show the carrying out of a cleaning process by the cleaning apparatus 19. In the tilt position of the solar cell module 13 shown in FIG. 2A, the cleaning roller 21 is located in the receiver 37. The tracking drive can provide this tilt position at sunrise, for example. During the course of the day, the tracking drive provides that the tilt position of the solar cell module 13 changes and indeed, starting from the position shown in FIG. 2A, first into a horizontal position and subsequently into an opposite tilt position as is shown in FIGS. 2B to 2D. Since the cleaning roller 21 is not fastened to the solar cell module 13, but is rather only guided by the guide cables 27, it moves downward from a specific tilt position over the tilted surface 15 driven by gravity (FIGS. 2B and 2C) and in this respect provides an effective cleaning of the surface 15.

The cleaning roller 21 finally arrives at the end 29 of the solar cell module 13 and is prevented from a further downward movement by abutting the rear wall 32 or the side walls 33. This state is shown in FIG. 2D. The corresponding tilt position of the solar cell module 13 can be achieved at sunset, for example. It is understood that the cleaning roller 21 moves over the surface 15 once more in a return movement of the solar cell module 13 from the tilt position shown in FIG. 2D into the tilt position shown in FIG. 2A.

The tracking drive of the photovoltaic system 11 thus provides, without any control measures and without a separate energy supply, that the surface 15 of the photovoltaic system 11 is cleaned twice per day. If this is not sufficient due to the application, the cleaning apparatus 19 could be provided with an electronic control device which is connected to the tracking drive and, where necessary, instructs it to bring about a plurality of additional, optionally fast, tilt movements. The cleaning apparatus 19 could equally comprise a trigger apparatus, e.g. in the form of a fixable swivel plate, which selectively blocks or releases the downward movement of the cleaning roller 21. A cleaning process can then in principle be started independently of the tracking drive. For example, it may be desired with specific systems to carry out cleaning processes only at longer time intervals.

In its downward movement, the cleaning roller 21 conveys contaminants down to the lower end 29 of the solar cell module 13 and in particular to the end plate 30 located there. The contaminants then fall through the holes 31. Contaminants possibly adhering to the cleaning roller 21 can, where necessary, be removed by an additional cleaning device, which is not shown in the Figures, however. Such a cleaning device could be integrated in one of the receivers 37, for example.

In FIGS. 3A to 3D, an alternatively designed photovoltaic system 11' is shown which is likewise provided with a cleaning apparatus 19'. Instead of a single cleaning roller 21, seven cleaning disks 41 are, however, provided here which slide over the surface 15 freely and unguided. It is understood that the size and the number of the cleaning disks 41 can be adapted to the respective application.

A specific exemplary embodiment of a cleaning disk 41 can be seen from the enlarged representation of FIG. 4. As shown, a disk-shaped base body 43 is provided with a set of bristles 45. The base body 43 could also have a different shape such as a block-like shape.

The photovoltaic system 11" shown in FIGS. 5A to 5D having an associated cleaning apparatus 19" is in principle designed in the exact same manner as the photovoltaic system 11' described with respect to FIGS. 4A to 4D, but with ball-shaped cleaning balls 51 being provided instead of the cleaning disks 41. They roll freely over the surface 15 and thus provide its cleaning.

An embodiment of the present disclosure, not shown, provides a plurality of cleaning elements of the same kind in the form of bulk material instead of the individual cleaning balls 51. This means that a quantity of cleaning granulate could be released from a corresponding container at the upper end 29 of the solar cell module 13 to clean the surface 15.

The present disclosure is particularly suitable for solar or photovoltaic systems having a tracking drive. The present disclosure is generally, however, also suitable for solar or photovoltaic systems having a statically tilted surface. To enable a multiple cleaning in such a system, the cleaning apparatus could be provided with a drive for a return transport of the cleaning element or cleaning elements.

Since gravity is used at a tilted surface to drive one or more cleaning elements, a photovoltaic system without an additional energy supply can be provided with an automatic cleaning function. It is of advantage in this respect that existing photovoltaic systems can also be retrofitted with corresponding cleaning apparatus in a relatively simple manner. A user of the system is freed of labor-intensive manual cleaning processes. The above-described cleaning measures are also advantageous in thermal solar systems and similar outdoor systems.

REFERENCE NUMERAL LIST 11, 11', 11" photovoltaic system
13 solar cell module
15 surface
17 stand
19, 19', 19" cleaning apparatus
21 cleaning roller
23 roller surface
25 cable guide roll
27 guide cable
29 end
30 end plate
31 hole
32 rear wall
33 side wall
37 receiver
41 cleaning disk
43 base body
45 set of bristles
51 cleaning ball
K tilt axis
R axis of rotation

The invention claimed is:

1. A solar or photovoltaic system comprising:
a cleaning apparatus for cleaning a surface of the solar or photovoltaic system, wherein the surface to be cleaned is tilted or tiltable with respect to the horizontal, and the cleaning device comprises a set of a plurality of cleaning elements, wherein each of the plurality of cleaning elements comprises a cleaning sliding body, wherein the cleaning apparatus is configured to carry out a cleaning process to clean the surface in which the set of the plurality of cleaning elements simultaneously move downward over the tilted surface solely by gravity, wherein the set of the plurality of cleaning elements has no own drive.

2. The solar or photovoltaic system in accordance with claim 1,
wherein the cleaning apparatus has a drive which is configured to move the cleaning element upward for a respective subsequent gravity-driven cleaning movement.

3. The solar or photovoltaic system in accordance with claim 1,
wherein the set of the plurality of cleaning elements freely slides over or rolls off the tilted surface in the cleaning process.

4. The solar or photovoltaic system in accordance with claim 1,
wherein the sliding cleaning body comprises a rolling cleaning body such as a cleaning ball.

5. The solar or photovoltaic system in accordance with claim 1,
wherein the sliding cleaning body is at least one of a cleaning block or a cleaning disk.

6. The solar or photovoltaic system in accordance with claim 1,
wherein the set of the plurality of cleaning elements are the same kind in the form of bulk material.

7. The solar or photovoltaic system in accordance with claim 1,
wherein each of the plurality of cleaning elements have a set of bristles or a set of hook and loop fasteners.

8. The solar or photovoltaic system in accordance with claim 1,
wherein the cleaning apparatus comprises a trigger apparatus which selectively blocks or releases a gravity-driven movement of the cleaning element over the tilted surface.

9. The solar or photovoltaic system in accordance with claim 1,
further comprising an abutment for bounding a gravity-driven downward movement of the set of the plurality of cleaning elements.

10. The solar or photovoltaic system in accordance with claim 1,
wherein the cleaning apparatus comprises a discarding device for contaminants collected by the cleaning element and to be discarded from the system.

11. The solar or photovoltaic system in accordance with claim 10,
wherein the discarding device comprises at least one ejection opening toward which the cleaning element is movable.

12. The solar or photovoltaic system in accordance with claim 10,
wherein the discarding device comprises an additional cleaning device for cleaning the cleaning element.

13. The solar or photovoltaic system in accordance with claim 1,
wherein the solar or photovoltaic system has a tracking drive to make the surface follow the position of the sun.

14. The solar or photovoltaic system in accordance with claim 13,
wherein the cleaning apparatus is connected to a control device of the tracking drive and is configured to bring about a tilt movement of the surface in order to carry out the cleaning process.

15. The solar or photovoltaic system in accordance with claim 1,
wherein the set of the plurality of cleaning elements has a surface section which is at least one of absorbent and promotes adhesion.

16. The solar or photovoltaic system in accordance with claim 1,
wherein the cleaning apparatus comprises a receiver for accommodating set of the plurality of cleaning elements.

17. A solar or photovoltaic system comprising:
a cleaning apparatus for cleaning a surface of the solar or photovoltaic system, wherein the surface to be cleaned is tilted or tiltable with respect to the horizontal, and wherein the cleaning apparatus is configured to carry out a cleaning process to clean the surface in which at least one cleaning element moves downward over the tilted surface driven by gravity,
wherein the cleaning element comprises a rolling cleaning body such as a cleaning roller or a cleaning ball,
wherein a guide is provided for the rolling cleaning body, and
wherein the guide comprises a guide cable which wraps around a cable guide section of the rolling cleaning body at least once.

18. A solar or photovoltaic system comprising:
a cleaning apparatus for cleaning a surface of the solar or photovoltaic system, wherein the surface to be cleaned is tilted or tiltable with respect to the horizontal, and wherein the cleaning apparatus is configured to carry out a cleaning process to clean the surface in which at least one cleaning element moves downward over the tilted surface driven by gravity, wherein the cleaning apparatus comprises a discarding device for contaminants collected by the cleaning element and to be discarded from the system.

19. The solar or photovoltaic system in accordance with claim 18, wherein the discarding device comprises at least one ejection opening toward which the cleaning element is movable.

20. The solar or photovoltaic system in accordance with claim 18, wherein the discarding device comprises an additional cleaning device for cleaning the cleaning element.

* * * * *